United States Patent [19]

Lee

[11] Patent Number: 5,669,666

[45] Date of Patent: Sep. 23, 1997

[54] DEVICE AND METHOD FOR AUTOMATICALLY CONTROLLING A HEADREST

[75] Inventor: Hyung-Ho Lee, Kyungnam-Do, Rep. of Korea

[73] Assignee: Hyundai Motor Company, Ltd., Seoul, Rep. of Korea

[21] Appl. No.: 628,340

[22] Filed: Apr. 5, 1996

[30] Foreign Application Priority Data

Apr. 6, 1995 [KR] Rep. of Korea .................. 95-7932

[51] Int. Cl.⁶ .................. A47C 1/10; A47C 7/36
[52] U.S. Cl. .................. 297/408; 297/410
[58] Field of Search .................. 297/408, 403, 297/410

[56] References Cited

U.S. PATENT DOCUMENTS

| | | | |
|---|---|---|---|
| 4,576,413 | 3/1986 | Hatta | 297/408 |
| 4,606,578 | 8/1986 | Yasui | 297/408 |
| 4,668,014 | 5/1987 | Boisset | 297/410 X |
| 4,765,683 | 8/1988 | Hattori | 297/408 X |
| 4,830,434 | 5/1989 | Ishida et al. | 297/408 |
| 4,861,107 | 8/1989 | Vidwans et al. | 297/408 |
| 5,011,225 | 4/1991 | Nemoto | 297/408 |
| 5,052,754 | 10/1991 | Chinomi | 297/408 |
| 5,054,856 | 10/1991 | Wang | 297/408 |
| 5,145,233 | 9/1992 | Nagashima | 297/408 |
| 5,222,784 | 6/1993 | Hamelin | 297/408 |

*Primary Examiner*—Peter M. Cuomo
*Assistant Examiner*—Rodney B. White

[57] ABSTRACT

A device for automatically controlling a headrest, includes a motor, a rotatable gear connected to the motor so as to provide rotating movement, a rack gear movably engaging with the rotatable gear to provide lineal movement, a rotator rotatably connected to the rack gear, a first connection mechanism for connecting the rack gear with the rotator, a second connection mechanism for connecting the rotator with the headrest, and a switch circuit for controlling rotation of the motor, whereby tilting of the headrest is automatically controlled by the switch circuit.

20 Claims, 1 Drawing Sheet

DEVICE AND METHOD FOR AUTOMATICALLY CONTROLLING A HEADREST

BACKGROUND OF THE INVENTION

1. Field of the Invention

The present invention relates to an improved auto headrest device and method for automatically controlling an auto headrest and more particularly, to a tilting headrest device and method for easily and effectively tilting an auto headrest according to the physical position of passengers in the vehicle.

2. Description of Related Art

Various types of auto headrests are known in the art. Generally, an auto headrest includes a stay rod having a plurality of projections for adjusting the height thereof so as to match with the heads of the passengers.

As shown in FIG. 1, a conventional auto headrest 100 includes a tilting shaft 1, a pair of stay rods 2, and a pair of clips 3 for binding the tilting shaft 1 and the stay rod 2, so as to manually control the angle of the headrest by friction force between surfaces of the tilting shaft 1 and of the stay rod 2.

However, such a conventional auto headrest suffers from a number of problems. For example, since the clips 3 develop the phenomena of aging which results in a decreased elasticity, the conventional auto headrest does not and cannot maintain angle control continuously.

SUMMARY OF THE INVENTION

Accordingly, it is an object of the present invention to provide an auto headrest device which eliminates the above problems encountered with conventional auto headrests.

Another object of the present invention is to provide a headrest device for easily and effectively tilting a headrest of a vehicle according to the physical position of passengers in the vehicle.

A further object of the present invention is to provide a device for automatically controlling a headrest, including a motor, a rotatable gear connected to the motor so as to provide rotating movement, a rack gear movably engaging with the rotatable gear to provide lineal movement, a rotator rotatably connected to the rack gear, a first connection mechanism for connecting the rack gear with the rotator, a second connection mechanism for connecting the rotator with the headrest, and a switch circuit controlling rotation of the motor, whereby tilting of the headrest is automatically controlled by the switch circuit according to the head position of the use in the vehicle or according to the user's preference.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an auto headrest device and a method for automatically controlling a headrest. The method includes the steps of: rotating a motor to rotate a pinion gear; providing a rack gear movably engaging with the pinion gear to provide lineal movement; connecting the rack gear with a rotator using a link member; connecting the rotator with a plurality of stay rods supporting the headrest; and rotating the rotator by the lineal movement of the rack gear so as to automatically control tilting of the headrest.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 2:
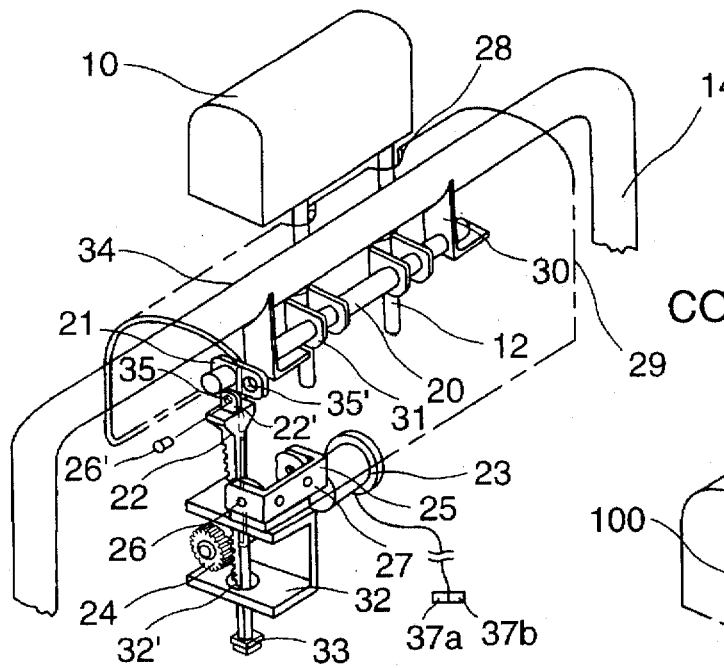
FIG. 2 is a perspective view of an auto headrest device capable of tilting an auto headrest according to the embodiments of the present invention.
Figure 1:
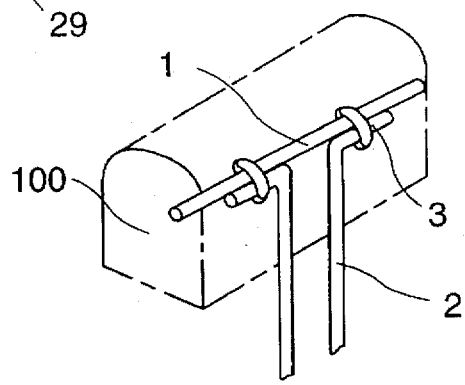
FIG. 1 is a perspective view of a conventional auto headrest.
Figure 3A:
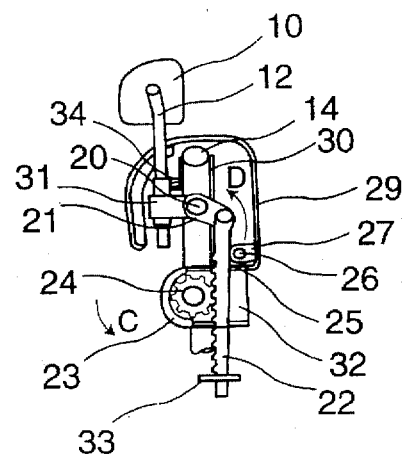
FIG. 3(A) is a side view of the auto headrest device in an original position according to the embodiments of the present invention.
Figure 3B:
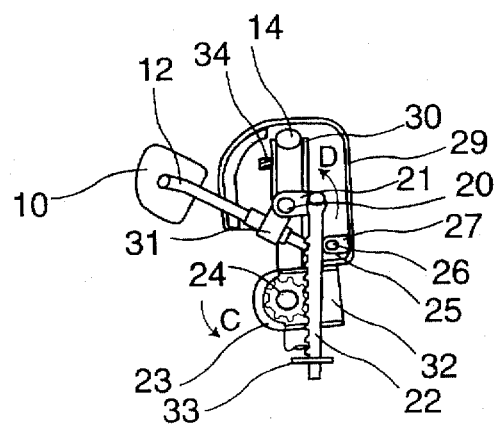
FIG.3(B) is a side view of the auto headrest device in an operating position according to the embodiments of the present invention.

Referring now in detail to the drawings for the purpose of illustrating preferred embodiments of the present invention, the auto headrest device capable of tilting an auto headrest, as shown in FIG. 2, comprises an auto headrest 10, a pair of stay rods 12 supporting the auto headrest 10, a rotator 20 having a pair of rod brackets 31 for attaching to and surrounding the stay rods 12, a rack gear 22 attached to the rotator 20 through a link member 21, and a pinion gear 24 being in gearing relationship with the rack gear 22 and attached to a motor 23, whereby upon operating the motor 23 by pressing on a switch 37a, the rack gear 22 is moved upwardly due to the rotation of the pinion gear 24 and the rotator 20 is rotated in the counter-clockwise direction so that the auto headrest 10 is rotatably moved downwardly for mating with the head position of the user or according to the preference of the user seated in the vehicle, as shown in FIG. 3(B).

The auto headrest device of the present invention further includes a cover frame 29 having a pair of guide holes 28 both disposed in parallel for slidably receiving the pair of stay rods 12, a fixed bracket 27 attached to the cover frame 29, a rotatable bracket 25 rotatably connected to the fixed bracket 27 by pins 26, and a guide bracket 32 fixed to the lower portion of the rotatable bracket 25 and having holes 32' for slidably receiving the rack gear 22 therethrough. The rotatable bracket 25 has a U-shaped configuration and supports movement of the rack gear 22 by being rotatably accommodating the movement of the rack gear 22. The brackets 25, 27, and 32 have a C-shaped configuration (FIG. 2). The rack gear 22 includes a stopper 33 disposed on a lower end portion thereof and an upper end portion 22' having an aperture 35 for receiving a pin 26' therethrough and through an aperture 35' of the link member 21 so as to connect the rack gear 22 with the link member 21. A seat frame 14 includes a pair of shaft brackets 30 each extending from a portion of the frame 14 for rotatably suspending the rotator 20, and a pair of buffer members 34 disposed on the shaft bracket 30 for reducing contact impact of the stay rods 12.

The rotator 20 is disposed horizontally in parallel with the seat frame 14 and the pair of shaft brackets 30 are disposed to support the rotator 20. The rotator 20 can freely rotate by being rotatably supported by the shaft brackets 30 and the rod brackets 31 have a U-shaped configuration. Since the U-shaped rod brackets 31 are fixedly attached to the stay rods 12 and to the rotator 20, when the rotator 20 rotates in the counter-clockwise direction the rod brackets 31 and the stay rods 12 rotate in the counter-clockwise direction (c direction), as shown in FIG. 3(B).

The combination of the rack gear 22 and the pinion gear 24 converts rotational movements into lineal movements. Also, the lineal movement of the rack gear 22 is limited by the stopper 33 in accordance with the length of a radius of the pinion gear 24. By pressing down a switch 37b, the motor 23 rotates in a reverse direction which rotates the pinion gear 24 in the clockwise direction. As a result, the rack gear 22 rotatably moves back to the original position shown in FIG. 3(A).

Referring to FIGS. 3(A) and 3(B), the auto headrest device for automatically tilting a headrest according to the present invention operates as follows. As shown in FIG. 3(A), the auto headrest device maintains a headrest in an original position. Thereafter, in order to match the physical frame of the user seated in the vehicle according to his or her preference, the user pushes the switch 37a to rotate the motor 23 in the c direction. Upon operating the motor 23, the pinion gear 24 rotates in the c direction to linearly move the rack gear 22 upwardly. The upward movement of the rack gear 22 causes the rotator 20 to rotate in the c (counter-clockwise) direction. The rotation of the rotator 20 then causes the rod brackets 31 and stay rods 12 to rotatably tilt downwardly. Accordingly, the auto headrest 10 is moved to fit the head of the user as shown in FIG. 3(B) and the user can fix the position of the headrest 10 by releasing the switch 37a. The movement of the rack gear 22 is limited by the stopper 33. The headrest 10 can be moved upwardly in the reverse (clockwise) direction by pressing on the switch 37b. That is, the switch 37a moves the headrest 10 downwardly in c-direction whereas the switch 37b moves the headrest 10 upwardly in the reverse direction, for example. The motor 23 can also be a two-way motor, for example.

Accordingly, the auto headrest device of the present invention permits automatic tilting of a headrest according to the head position or preference of the user seated in the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the headrest device of the present invention can be installed for headrests in cars, trains, airplanes, at offices and homes, etc.

What is claimed is:

1. A device for automatically controlling a headrest, the device comprising:
    a rotatable gear connected to a motor, the motor rotating the rotatable gear;
    a rack gear movably engaging with the rotating rotatable gear to provide lineal movement;
    a rotator rotatably connected to the rack gear, the rotator having a predetermined configuration such that the rotator occupies one position throughout an operation of the rotator;
    first connection means for connecting the rack gear with the rotator;
    second connection means for connecting the rotator with the headrest; and
    a switch circuit for controlling rotation of the motor,
    whereby tilting of the headrest is selectively controlled by the switch circuit.

2. A device of claim 1, wherein the first connection means includes:
    an aperture defined in an upper portion of the rack gear,
    a link member being rotatable and fixedly attached to the rotator, the link member defining a first hole for receiving the rotator therethrough and a second hole for connecting with the rack gear, and
    a pin inserted through the aperture and the second hole of the link member for connecting the rack gear with the rotator so as to provide rotation of the rotator by the lineal movement of the rack gear wherein the rotator is a straight rod.

3. A device of claim 2, wherein the second connection means includes:
    a plurality of stay rods attached to the head rest, and
    a plurality of rod brackets for linking the stay rods and the rotator, each rod bracket having two holes at ends thereof, the rotator being inserted through the two holes of each rod bracket so as to form a hole for a corresponding stay rod to pass through.

4. A device of claim 1, wherein the second connection means includes:
    a plurality of stay rods attached to the head rest, and
    a plurality of rod brackets for linking the stay rods and the rotator, each rod bracket having two holes at ends thereof, the rotator being inserted through the two holes of each rod bracket so as to form a hole for a corresponding stay rod to pass through.

5. A device of claim 4, further comprising:
    a cover frame for covering the rotator;
    a fixed bracket attached to the cover frame;
    a rotatable bracket rotatably connected with the fixed bracket; and
    a guide bracket fixedly attached to the rotatable bracket,
    whereby the rack gear is supported by the rotatable bracket as the rotatable bracket rotatably guides the lineal movement of the rack gear.

6. A device of claim 5, wherein each of the fixed bracket, the rotatable bracket, the guide bracket has substantially a C-configuration.

7. A device of claim 6, wherein end portions of the rotatable bracket are rotatably connected to end portions of the fixed bracket using a pin, and an upper end portion of the guide bracket is attached to a middle portion of the rotatable bracket.

8. A device of claim 5, wherein each end portion of the guide bracket defines a hole through which the rack gear is linearly moved and the rack gear includes a stopper at a lower portion thereof for limiting an upward movement of the rack gear through the holes of the guide bracket.

9. A device of claim 4, wherein the switch circuit includes:
    a first switch for causing the rotator to rotate in a first direction so as to tilt the headrest in the first direction, and
    a second switch for causing the rotator to rotate in a second direction so as to tilt the head rest in the second direction.

10. A device of claim 9, wherein each of the first and second switches, being pressed, activates the rotation of the motor and, being released, stops the rotation of the motor.

11. A device of claim 4, wherein the headrest is for a seat in a vehicle and the rotator is a straight rod.

12. A device of claim 4, wherein each of the rod brackets has a U-configuration for receiving the corresponding stay rod therethrough, a middle portion of the rod bracket fixedly wrapping the corresponding stay rod.

13. A device of claim 4, further comprising:

a seat frame fixed to a seat; and a plurality of shaft brackets extending from the seat frame, each of the shaft brackets having substantially an L-configuration and defining an aperture for receiving the rotator therethrough.

14. A device of claim 1, further comprising:

a seat frame fixed to a seat of a vehicle; and a plurality of shaft brackets extending from the seat frame, each of the shaft brackets having substantially an L-configuration and defining an aperture for receiving the rotator therethrough, wherein the rotator is a straight rod.

15. A method of automatically controlling a headrest, the method comprising the steps of:

rotating a motor to rotate a pinion gear;

providing a rack gear movably engaging with the pinion gear to provide lineal movement;

connecting the rack gear with a rotator using a link member;

connecting the rotator with a plurality of stay rods supporting the headrest; and rotating the rotator by the lineal movement of the rack gear so as to selectively control tilting of the headrest, whereby the rotator occupies one position during the rotation of the rotator.

16. A method of claim 15, wherein the rotator is a straight rod, and the method further comprising the step of:

controlling the rotation of the motor using a switch operated by a user so that a direction and amount of the rotation of the motor can be selectively changed.

17. A method of claim 15, wherein the step of connecting the rack gear with a rotator includes the steps of:

providing an aperture at one end portion of the rack gear, providing the link member having a first hole for receiving the rotator therethrough and a second hole for connecting with the rack gear, and inserting a pin through the aperture of the rack gear and the second hole of the link member, whereby the lineal movement of the rack gear causes the rotator to rotate.

18. A method of claim 15, wherein the rotator is a straight rod, and the step of connecting the rotator with a plurality of stay rods includes the steps of:

providing a plurality of rod brackets, each rod bracket having two holes at ends thereof and having a U-configuration for receiving a corresponding stay rod therethrough, inserting the rotator through the two holes of each rod bracket so as to form a hole for the corresponding stay rod to pass through, and fixedly wrapping the corresponding stay rod with the middle portion of the U-configuration of the rod bracket.

19. A method of claim 18, further comprising the steps of:

covering the rotator with a cover frame;

attaching a fixed bracket to the cover frame;

rotatably connecting a rotatable bracket with the fixed bracket; and fixedly attaching a guide bracket to the rotatable bracket, whereby the rack gear is supported by the rotatable bracket as the rotatable bracket rotatably guides the lineal movement of the rack gear.

20. A method of claim 19, wherein end portions of the rotatable bracket are rotatably connected to end portions of the fixed bracket using a pin, and an upper end portion of the guide bracket is attached to a middle portion of the rotatable bracket.

* * * * *